Dec. 16, 1969    H. KAISER    3,483,784
SKIVE CUTTING MACHINE
Filed May 15, 1967    5 Sheets-Sheet 3

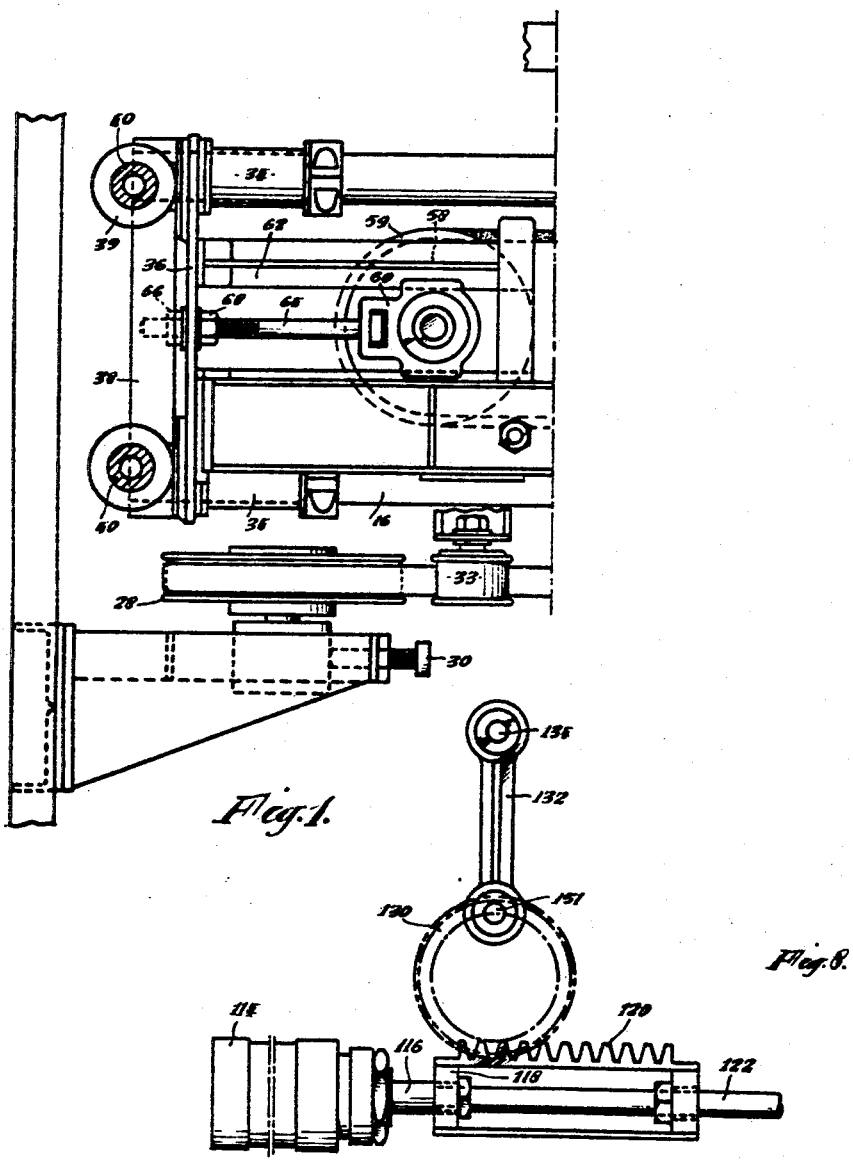

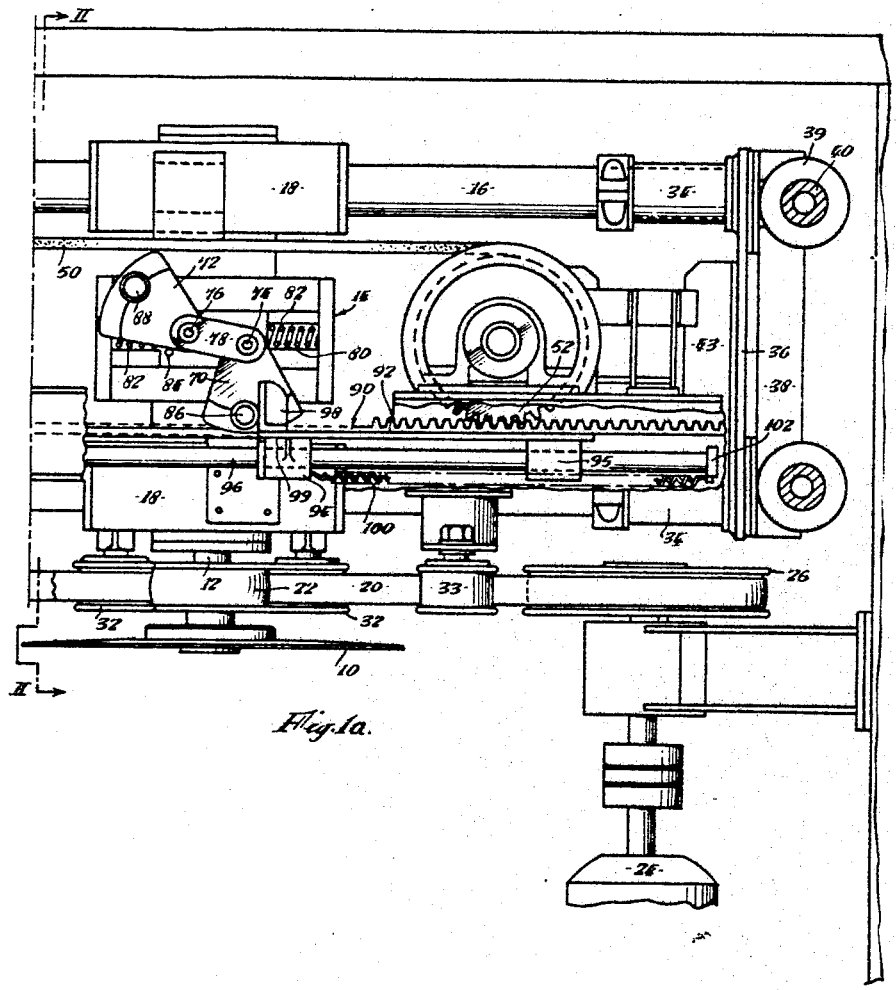

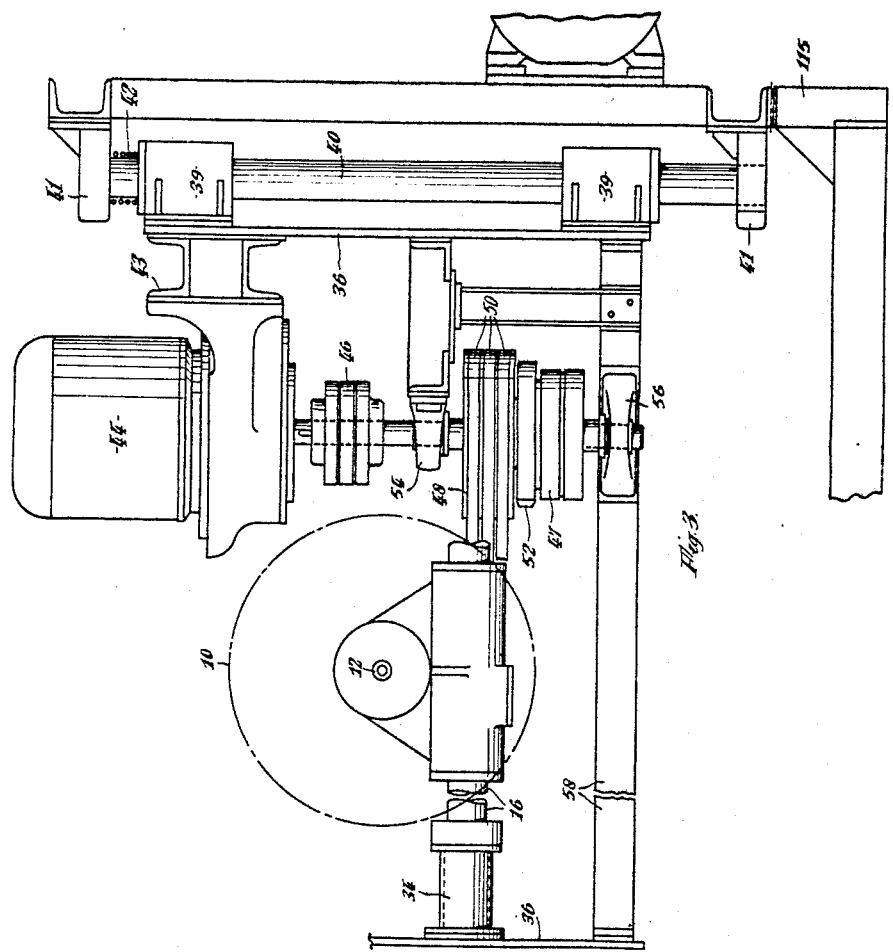

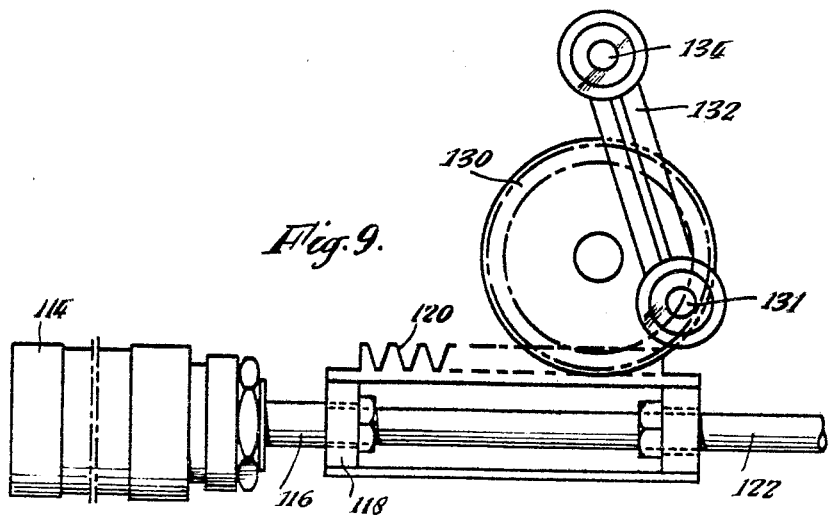
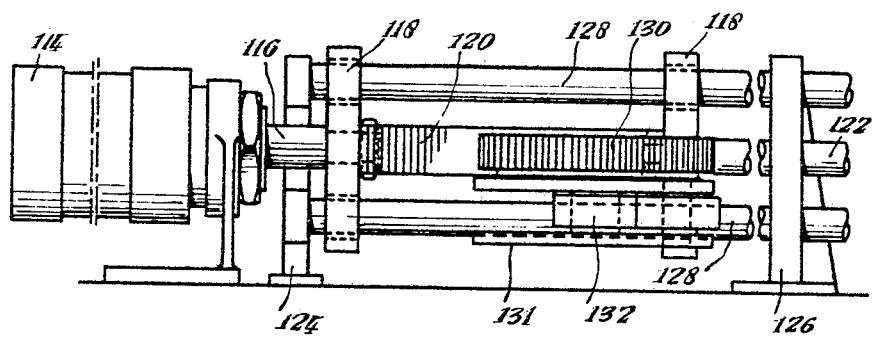
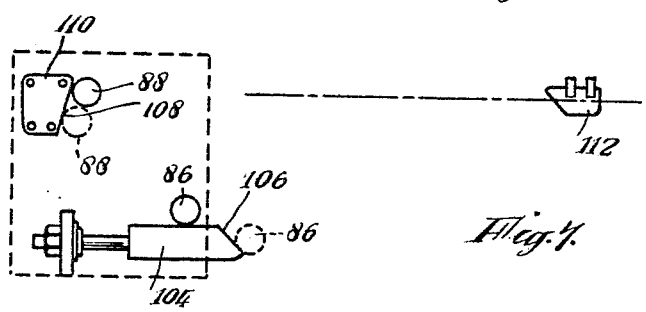

United States Patent Office 3,483,784
Patented Dec. 16, 1969

3,483,784
SKIVE CUTTING MACHINE
Herbert Kaiser, Somerset, England, assignor to Avon Rubber Company Limited, Melksham, Wiltshire, England, a company of Great Britain and Northern Ireland
Filed May 15, 1967, Ser. No. 638,297
Claims priority, application Great Britain, May 20, 1966, 22,687
Int. Cl. B26d 1/18
U.S. Cl. 83—215                                13 Claims

ABSTRACT OF THE DISCLOSURE

A skive cutting machine suitable for cutting lengths from a moving band of rubber is described in which the rotating knife is carried on a movable carriage and the knife is rotated by a belt driven by a motor which is mounted independently of the carriage. This overcomes the difficulty of moving the motor with the knife. Means for traversing the carriage through cutting and return strokes are described and also means for moving the carriage into and out of the cutting position in such manner that the knife moves in its own plane.

This invention relates to a skive cutting machine and more particularly to a skive cutting machine useful for making skive cuts in stationary bands of material, especially bands of elastomeric material, e.g. pneumatic tyre tread and sidewall stock.

In our co-pending British application No. 40998/62, Ser. No. 1,070,003, we describe a skive cutting machine in which a rotating blade is driven by an electric motor and the electric motor is carried on the same mounting as the blade and consequently must be made to perform all the movements of the cutting cycle. A disadvantage of this machine is that as the electric motor has to be carried at all stages of the cutting cycle the weight and inertia of the electric motor limit the speed at which the cycle may be conducted. It is known that such motors have considerable mass when compared with the mass of the blade and its mounting and consequently increase to an undesirable extent the mass of the cutting unit that has to be moved during the cutting stroke and remainder of the cycle. Another disadvantage is that excessive wear and tear is caused to the motor and to other parts of the machine which have to bear the acceleration, deceleration and frictional forces caused when the cutting unit is moved.

It is an object of this invention to overcome or diminish these difficulties.

According to this invention we provide a skive cutting machine having a rotatable knife and a mounting therefor which are movable to perform a cutting cycle wherein the knife is rotated at least throughout a cutting stroke by means of a driven belt which operatively engages a driving wheel for the knife. Use of the belt to rotate the knife makes it possible to avoid mounting a motor on the movable knife mounting. The driving wheel for the knife may be mounted co-axially with the knife for rotation therewith e.g. mounted on and secured to the knife or a spindle for said knife.

We may provide a machine in which the driven belt is in continuous operative engagement with the driving wheel for the knife.

Preferably, the mounting for the knife is caused to make the cutting stroke by means of one or more moving belts which are engaged by engagement means provided on said mounting. Such engagement means may include a cam plate which is rotatable to produce a wedging action between the mounting and the belt or belts.

We may provide a skive cutting machine having means for retracting the knife mounting so that the knife is moved clear of the material to be cut at an end of the cutting stroke and means for causing the mounting to perform a return stroke to the side of the material from which the cutting stroke was begun and means for advancing it to a position from which another cutting stroke may be made wherein the means for causing the mounting to perform the return stroke comprise one or more moving belts which are engaged by engagement means provided on said mounting. The last mentioned belt or belts and a belt or belts engaged to cause the mounting to make the cutting stroke may be the same, being retracted after a cutting stroke and advanced before a cutting stroke together with the knife mounting.

Our invention is applicable both to the cutting of material which is stationary during the cutting stroke and to the cutting of material which is moving during the cutting stroke, in which case the machine is arranged to move forward with the material as it is cut.

One form of the invention, suitable for cutting lengths from a moving band of pneumatic tyre tread and sidewall stock while held in a stationary state by suitable braking means will be described with reference to the accompanying drawings wherein:

FIG. 1 and continuation FIG. 1a together represent a front elevational view of the machine (the knife blade is shown in plan) a central part being broken away;

FIG. 3 is a plan view of the machine shown in FIG. 1 with certain parts omitted;

FIG. 7 shows a cam arrangement;

FIGS. 8 and 9 are elevational views of hydraulic or pneumatic means for retracting parts of the machine including the knife mounting at the end of a cutting stroke and advancing the same at the end of a return stroke; and FIG. 10 is a plan view of the hydraulic means shown in FIG. 9.

Figure 2:
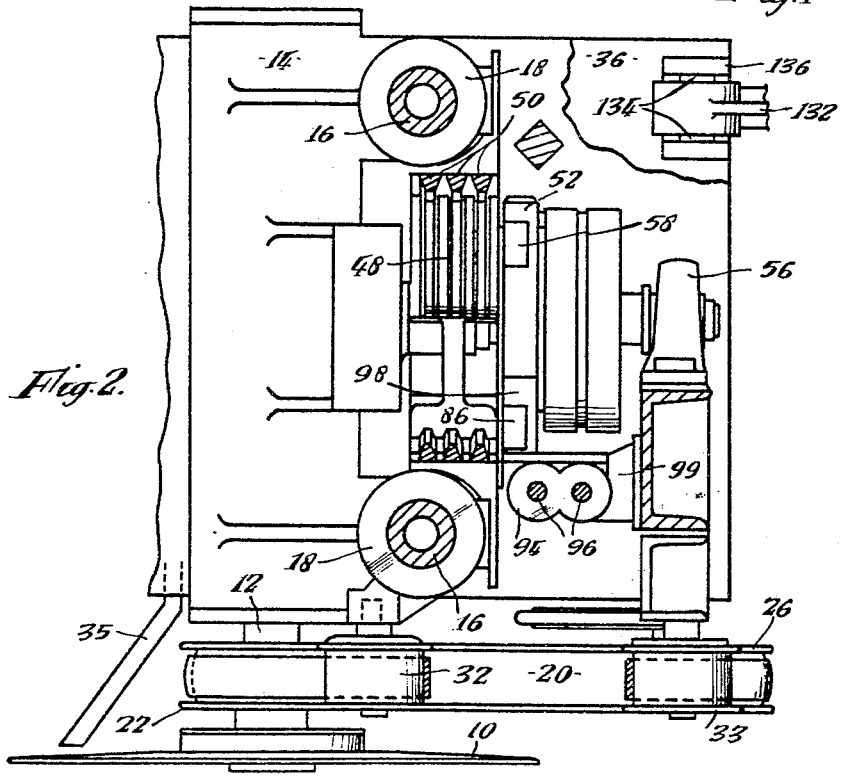
FIG. 2 is a cross-sectional view (partly broken away) taken on the line II—II in FIG. 1.

Referring to FIGS. 1 and 2, a rotating blade 10 secured to a spindle 12 has for a mounting a carriage indicated generally at 14. The carriage is slidably mounted on a pair of parallel bars 16, which we shall refer to as transverse bars 16, by means of roller bearings carried within sleeve portions 18 forming part of the carriage.

The blade 10 and spindle 12 are driven by means of a belt 20 which makes operative engagement with a driving wheel 22 which is fast with the blade 10 and spindle 12. In an alternative arrangement, the driving wheel for the blade need not be concentric with the blade and blade spindle but may be mounted to one side and geared or otherwise linked to the blade. The belt 20 is driven by a wheel 26 carried by the spindle of a fixed electric motor 24. At the end remote from the wheel 26, the belt passes round a pulley 28 the position of the axis of which is adjustable by means of the screw 30.

Figure 6:
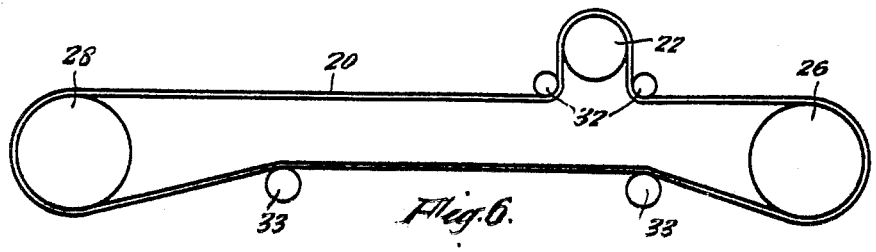
FIGS. 4, 5 and 6 illustrate the drive to the knife during successive stages of a cutting cycle.
Figure 5:
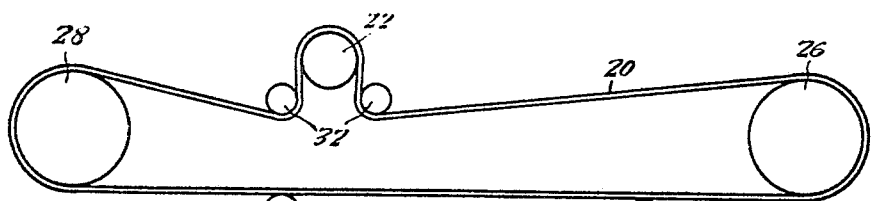
Figure 4:
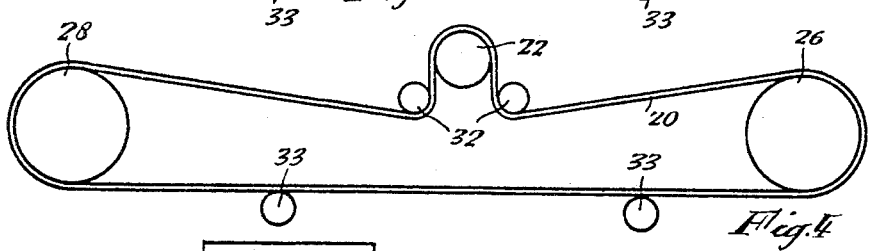

The belt 20 is led on to and taken off the driving wheel 22 by means of pulleys 32 which are mounted on the carriage and therefore are in fixed relation to the driving wheel 22. Guide rollers 33 mounted on transverse assembly subsequently to be described are provided to guide the belt 20 between the wheel 26 and pulley 28 on the side opposite from the driving wheel 22. The relative positions of the driving wheel 22, the pulley 32 and the guide rollers 33 and the disposition of the belt 20 are seen in FIGS. 4 to 6 described more fully later in the specification. A tube 35 for spraying the rotating blade 10 with water is shown in FIG. 2.

Referring to FIGS. 1 and 3 the traversing bars 16 are journalled in socket members 34 which are secured to plates 36 which join frame members 38 having sleeve portions 39. The frame members 38 are mounted by means of the sleeve portions 39 on posts or bars 40 which will be referred to as riser bars 40. The riser bars 40 are journalled in fixed collars 41 and the sleeve portions 39 are cushioned from the collars 41 by compression springs 42. To the plate 36 there is secured a mounting 43 for an electric motor 44 which drives through clutch means 46 a drive wheel 48 for three V belts 50 and through clutch means 47 a pinion 52. Bearings 54, 56 are provided for the spindle of the motor 44.

Opposing plates 36 secured to frame members 38 are tied by means of stays one of which is seen at 58 in FIG. 3 so that a rigid framework is formed which is slidable on the riser bars 40 and carries the transverse bars 16 and the motor 44 with its attachments. This assembly will be referred to as the transverse assembly. As hereinafter explained, the transverse assembly can be moved towards and away from the material to be cut at different stages of the cutting cycle.

The V belts 50 pass round the drive wheel 48 driven by the motor 44 and round a pulley 59 which has a mounting 60 slidably mounted on a framework 62 which is secured to plate 36 at the left-hand side of the transverse assembly as seen in FIG. 1. The position of the axis of the pulley 59 is adjustable by means of a screw attachment 64, a threaded end of which passes through the plate 36 and is movable with respect thereto by means of a nut 66, a locking nut 68 also being provided. The pulley 59 can be kept adjusted so that the V belts are under correct tension. The purpose of the V belts is to provide means for causing the carriage 14 to make a cutting stroke and also to provide means for causing the carriage to make a return stroke.

Means for engaging the V belts are in the form of cam plates 70, 72 which are rotatably mounted respectively on pivots 74, 76 joined by a tie 78. Pivots 74, 76 pass through a block which floats in a channel 80 formed in the carriage 14 being retained therein by means of springs 82. The purpose of the springs 82 is to centralise the pivots 74, 76 when the carriage is in the rest position and to some extent to limit the acceleration experienced by the carriage and the blade when the cam plates engage the V belts 50. One of the springs 82 will be placed under compression during a cutting stroke and the other during a return stroke.

Owing to the good sliding properties of the roller bearings in the sleeve portions 18 on the transverse bars 16, and to the comparatively small mass of the carriage 14 and its attachments the springs 82 recover the larger part of their initial compression, caused when the cam plate 70 or 72 comes into engagement with the V belts 50, before the end of the tranversing motion, i.e. the cutting stroke or the return stroke. The initial compression and subsequent recovery of the springs 82 serve to smooth out the rate of acceleration.

A stop 84 is provided to prevent the rotation of the cam plate 72 further to the left than is seen in FIG. 1 and return springs (not shown) are also provided to control the positions of the plates 70, 72 when not engaging the V belts 50. Bosses 86 and 88 are secured to the cam plates 70 and 72 respectively (FIGS. 1 and 2). The bosses 86 and 88 provide abutments on the cam plates by which the cam plates individually can be moved into and out of engagement with the V belts 50 in order to perform a traversing motion. It will be seen that each of the cam plates has a curved edge and two straight edges. In each case, one of the straight edges is shorter than the other and it is the end of the curved edge adjacent the shorter straight edge which first engages the belts 50 when the cam plate is urged into the engaging position. As seen in FIG. 1, the movement for engaging the belts is clockwise for both cam plates. As soon as the cam plate has begun to engage the belt, the movement of the belt and the lag of the carriage in taking up the movement combine to force the cam plate to rotate further in a clockwise position in a wedging action and so lock the carriage to the belt by friction.

In order to urge the plate 70 into engagement with the belts 50 at the beginning of a cutting stroke, a kicker mechanism indicated generally at 90 is employed (FIG. 1). The kicker mechanism comprises a rack 92 mounted by means of blocks 94 on rails 96 (see also FIG. 2). At one end of the rack 92 there is secured a striker 98 which is aligned with the boss 86 on the cam plate 70. The rack 92 meshes with the pinion 52 above described. In the position shown in FIG. 1, the rack 92 has been driven forward by the pinion 52 and the striker 98 has made impact with the boss 86 and urged the cam plate 70 into engagement with the belts 50 to commence a cutting stroke.

The pinion 52 is operated by means of a motor 44 when engagement with the spindle of the motor is provided by the clutch means 47. The clutch means 47 engage in response to a micro-switch, or photocell (not shown) which is placed in the path of the material to be cut. After one cutting stroke is complete, the band of material is moved forward at such a rate that before sufficient length has run out in front of the blade 10, the machine will be ready for another cut. The micro-switch or photocell is placed at such a position in relation to the knife blade 10 that the correct length of material runs out in front of the blade before reaching the micro-switch or photocell. As soon as the leading edge of the band of material reaches the micro-switch or photocell the material is halted, e.g. by suitable braking means and at the same time the clutch 47 is operated and the cam plate 70 is made to engage the belts 50 by means of the kicker mechanism 90 and another cut is begun.

As the rack 92 reaches the end of its forward travel, a cam 99 actuates a micro-switch (not shown) which disengages the clutch mechanism 47 so allowing the rack 92 to be retracted to its starting position by means of a tension spring 100. This spring is secured between the block 94 and an attachment 102 on the rails 96.

FIG. 7 shows a cam arrangement for operating on the bosses 86, 88 at the end of the cutting stroke, at the beginning of the return stroke, and at the end of the return stroke.

Cam 104 has a face 106 which is engaged by the boss 86 as the carriage 14 approaches the end of a cutting stroke. The initial position of the boss 86 as it reaches the cam face 106 is shown in the broken lines. After further movement up to the limit of left-hand movement of the carriage 14 (as seen in FIGS. 1 and 7) the position of the boss 86 is shown by the full line. The effect of the motion of the boss 86 over the cam face 106 is to sweep the cam plate 70 out of engagement with the belts 50 thus stopping the application of tractive force to the carriage in the left-hand direction.

When the boss 86 is in the position shown by the broken lines, the boss 88 on the cam plate 72 reaches a position shown by the broken lines at 88 in FIG. 7. In this position it impinges on a cam surface 108 of cam 110. When the boss 86 reaches its full line position, by the final left-hand movement of the carriage 14, the boss 88 reaches the full line position in FIG. 7. This is achieved by clockwise rotation of the cam plate 72 which rotation brings the curved surface of the cam plate 72 into engagement with the belts 50. The motion of the belts 50 causes the cam plate 72 to wedge tightly against the belts and the carriage is thus caused to perform the return stroke.

On reaching the end of the return stroke, the boss 88 strikes a cam 112 and the cam plate 72 is knocked out of engagement with the belt 50. The carriage 14 comes to rest with the boss 86 in front of the striker 98 in its retracted position ready for another cutting stroke to begin on the rotation of the pinion 52 in response to a signal from the micro-switch or photocell associated with the clutch means 47.

FIGS. 8, 9 and 10 show hydraulic or pneumatic means for retracting and advancing the transverse assembly at the end of cutting and return strokes respectively. The assembly has to be retracted at the end of a cutting stroke in order for the blade 10 to clear the material to be cut and subsequently, after the return stroke, has to be advanced so that the knife is in a position to make another cutting stroke. When in the return stroke position, the upper sleeve portions 39 of each frame member 38 (as seen in FIG. 3) rest on the springs 42.

The hydraulic or pneumatic means comprise a hydraulic or pneumatic cylinder 114 secured to framework 115 (FIG. 3) below the transverse assembly as would be seen in this figure. The middle part of the cylinder is shown broken away in FIGS. 8 to 10. The cylinder has a piston 116 secured to a yoke 118 carrying a rack 120. In line with the piston 116 there is a push-rod 122 secured to the opposite end of the yoke 118.

Journalled in stands 124 and 126 (shown in FIG. 10 but omitted from FIGS. 8 and 9) are slide rods 128 which serve as bearings for the frame 118 as the latter is pushed to the right as seen in FIGS. 8 and 9 by the piston 116 and subsequently returned by the cylinder 114 which is double acting.

Meshing with the rack 120 is a pinion 130 carrying concentrically with itself a crank wheel 131 to which there is pivoted a crank 132. The other end of the crank 132 is pivoted at 134 to stays 136 (see FIG. 2) secured between the plates 36 of the traversing assembly. These stays could e.g. be stays as shown at 58 in FIG. 3.

The push-rod 122 connects with a similar yoke and rack and pinion device to that shown in FIGS. 8 to 10 at the other side of the transverse assembly which rack and pinion has another crank similar to crank 132 which serves to advance and retract the transverse assembly together with the first mentioned crank so as to provide a synchronised movement to both sides of the transverse assembly.

When the cutting stroke begins the rack and pinion 120, 130 are in the positions shown in FIG. 8. As soon as the boss 86 strikes the cam face 106, a micro-switch operates means for pressurizing a hydraulic or pneumatic cylinder 114 and the rack and pinion are operated to retract the transverse assembly, taking up the position shown in FIG. 8.

The assembly is retracted sufficiently for the blade to clear the material to be cut before the return stroke is begun. It will be seen from FIGS. 1 and 2 that the effect of retracting the transverse assembly on the riser bars 40 is to retract the blade 10 in its own plane which is believed to be a novel and advantageous procedure. The effect of retracting the blade in this manner is that the distance which it has to be retracted in order to clear the material to be cut is at a minimum thus saving time taken for the retracting stroke and reducing mechanical work to a minimum.

The transverse assembly remains in the retracted position until the boss 88 strikes the cam 112 at the end of the return stroke which operates a micro-switch which in turn causes the hydraulic or pneumatic cylinder to be reverse-actuated so that the push-rod 122 operates to return the frame 118 and the rack 120 to their positions shown in FIG. 9, and the pinion 130 and crank wheel 131 to turn clockwise so advancing the transverse assembly.

With reference to FIGS. 4 to 6, it will be appreciated that although the drive wheel 22 for the cutter blade 10 and guide pulleys 32 advance and retract with the transverse assembly, the wheel 26 and the pulley 28 carrying the drive belt 20 remain stationary. The guide pulleys 33 mounted on transverse assembly are provided to compensate for the slackening in the belt 20 that would otherwise be produced when the driving wheel 22 and guide pulleys 32 advanced and retracted. FIG. 4 represents the disposition of the belt just before the midpoint of the cutting stroke is reached, FIG. 5 the disposition as the end of the cutting stroke is approached and FIG. 6 represents the disposition during the return stroke when the driving wheel 22 has been retracted with its carriage. We have calculated that the length of a belt under the same tension in each of the three dispositions would vary by an insignificant amount and it is therefore possible to use a belt tension which will transmit adequate driving force to the wheel 22 at all positions of the wheel. It has therefore been found quite satisfactory to use a stationary motor for driving the blade and to benefit from the advantages which have been described of a machine in which the motor does not have to be carried by the blade mounting.

What is claimed is:

1. A skive-cutting machine having a rotatable knife and a mounting therefor which are movable to perform a cutting cycle, a driving wheel for the knife, and a driven belt which operatively engages the driving wheel for the knife to rotate the knife at least throughout a cutting stroke, wherein the knife mounting has engagement means for engaging at least one moving belt so that the knife makes a cutting stroke and engagement means for engaging at least one moving belt so that the knife makes a return stroke to the side of the material from which the cutting stroke was begun, the engagement means in each case comprising a cam plate which is rotatable to produce a wedging action between the knife mounting and the moving belt, the machine having means for retracting the knife mounting so that the knife is moved clear of the material to be cut at the end of the cutting stroke and means for advancing the mounting to a position from which another cutting stroke may be made, the machine further having a cam for engagement by an abutment on one of said cam plates as the mounting for the knife reaches the end of the cutting stroke to move the cam plate into engagement with the moving belt and begin the return stroke.

2. A skive-cutting machine having a rotatable knife and a mounting therefor which are movable to perform a cutting cycle, a driven wheel for the knife, and a driven belt which operatively engages the driving wheel for the knife to rotate the knife at least throughout a cutting stroke wherein the mounting for the rotatable knife comprises a carriage slidably mounted on a transverse assembly to perform cutting and return strokes by traversing thereon, a motor mounted on the transverse assembly towards one end thereof for driving at least one belt, referred to as a traversing belt, for traversing the carriage, a pulley mounted towards the other end of the assembly around which the traversing belt passes, rotatable cam plates on the carriage to engage in sequence the traversing belt so that the belt moves the carriage through the cutting and return strokes, means for engaging the cam plates with the belt and disengaging them therefrom respectively at the beginning and end of the strokes, means for advancing the transverse assembly to a cutting position after the return stroke and means for retracting it at the end of the cutting stroke operating to move the carriage in such manner that the knife blade moves in its own plane, means for driving the driven belt in the form of an elongated loop, the driven belt continuously operatively engaging the knife driving wheel, the loop passing about centres which are longitudinally outward of the limits of traverse of the knife driving wheel, said means being mounted independently of the transverse assembly, guides on the carriage to lead the driven belt on one side of the loop on to the knife driving wheel and take it off therefrom, and guides on the transverse assembly for the other side of the loop to keep the driven belt in tension as the transverse assembly advances to and retracts from the cutting position.

3. A skive-cutting machine for making skive cuts in a band of elastomeric stock while the stock is stationary comprising a transverse assembly to be mounted transversely to the stock, a carriage mounted on the transverse assembly to traverse thereon in two opposite directions transversely to the stock, a rotatable knife mounted on the carriage, the rotatable knife traversing with the carriage to perform cutting and return stokes, a driving belt to rotate the knife at least throughout the cutting stroke, means for advancing the transverse assembly towards the plane of the stock to a cutting position before a cutting stroke and means for retracting it away from the plane of stock to that the knife clears the stock before a return stroke, and means for causing the carriage to traverse on the transverse assembly.

4. A skive-cutting machine according to claim 3 wherein the knife-driving belt is in continuous operative engagement with a driving wheel for the knife mounted on the carriage.

5. A skive-cutting machine according to claim 3 wherein the means for causing the carriage to traverse on the transverse assembly comprises at least one moving belt engageable by engagement means on the carriage.

6. A skive-cutting machine according to claim 5 wherein the moving belt is in the form of an endless belt passing around a drive wheel and pulley spaced from said drive wheel, said drive wheel and a motor therefor and said pulley being mounted on the transverse assembly.

7. A skive-cutting machine according to claim 5 wherein the engagement means includes cam plates which are rotatable to produce a wedging action between the carriage and the belt.

8. A machine according to claim 7 having a kicker mechanism including a striker to make impact with a boss on one of said cam plates to urge the cam plate into engagement with the moving belt and begin the cutting stroke.

9. A machine according to claim 7 wherein said engagement means comprise two cam plates and wherein fixed cams are positioned to engage bosses on the cam plates at the end of a cutting stroke and at the beginning of a return stroke to disengage one cam plate from a section of the belt moving in cutting stroke direction and urge the other cam plate into engagement with a section of the belt moving in the return stroke direction.

10. A machine according to claim 9 wherein the cam plates are pivotally mounted on a block which acts on the carriage through springs one of which is capable of being compressed at the beginning of a cutting stroke and another at the beginning of a return stroke.

11. A machine according to claim 3 wherein the transverse assembly comprises parallel bars, on which the carriage is mounted to slide to perform the cutting and return strokes, and joining members having sleeve portions slidable on posts to advance and retract the transverse assembly.

12. A machine according to claim 11 wherein the posts are arranged parallel to the knife blade so that the blade is advanced and retracted towards and away from the plane of the material to be cut in its own plane.

13. A machine according to claim 12 wherein the transverse assembly is advanced and retracted by means of a crank wheel and crank driven by a rack and pinion.

References Cited

UNITED STATES PATENTS

| 878,527 | 2/1908 | Heil | 83—488 X |
| 933,688 | 9/1909 | Atwood | 83—488 X |
| 1,147,289 | 7/1915 | Williams | 143—47.7 |
| 2,341,870 | 2/1944 | Johnston | 143—47.7 |

DONALD R. SCHRAN, Primary Examiner

J. F. COAN, Assistant Examiner

U.S. Cl. X.R.

83—488; 143—47, 106

PO-1050
(5/69)

UNITED STATES PATENT OFFICE
CERTIFICATE OF CORRECTION

Patent No. 3,483,784      Dated December 16, 1969

Inventor(s) Herbert Kaiser

It is certified that error appears in the above-identified patent and that said Letters Patent are hereby corrected as shown below:

Claim 2, line 44 "driving" wheel instead of "driven" wheel

Claim 2, line 54 left out "transverse" before assembly

Claim 3, line 13 left out "the" before stock and has "to" instead of "so".

SIGNED AND
SEALED
JUN 2 1970

(SEAL)
Attest:

Edward M. Fletcher, Jr.
Attesting Officer

WILLIAM E. SCHUYLER, JR.
Commissioner of Patents